(12) United States Patent
Yoshino

(10) Patent No.: US 6,308,086 B1
(45) Date of Patent: Oct. 23, 2001

(54) PORTABLE CELLULAR PHONE WITH CUSTOM MELODY RING SETTING CAPABILITY

(75) Inventor: Hideyuki Yoshino, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/228,736

(22) Filed: Jan. 12, 1999

(30) Foreign Application Priority Data

Jan. 30, 1998 (JP) .................................................. 10-032400

(51) Int. Cl.[7] .............................. H04B 1/38; H04M 1/00
(52) U.S. Cl. ......................... 455/567; 455/415; 379/374
(58) Field of Search .................................... 455/566, 567, 455/414, 415, 556, 557; 379/373, 374; 315/27; 84/422, 601, 470 R; 984/302; 704/276, 207

(56) References Cited

U.S. PATENT DOCUMENTS

| 4,230,012 | * | 10/1980 | Bommersbach et al. | 984/302 |
| 4,866,766 | | 9/1989 | Mitzlaff . | |
| 5,153,829 | * | 10/1992 | Furuya et al. | 84/622 |
| 5,481,599 | * | 1/1996 | MacAllister et al. | 379/374 |
| 5,598,461 | | 1/1997 | Greenberg . | |
| 5,655,016 | * | 8/1997 | Emery | 379/374 |
| 5,953,408 | * | 9/1999 | Blanvillainet al. | 379/374 |
| 6,094,587 | * | 7/2000 | Armanto et al. | 455/567 |

FOREIGN PATENT DOCUMENTS

| 0 795 845 | 9/1997 | (EP) . |
| A-9-149098 | 6/1997 | (JP) . |

* cited by examiner

*Primary Examiner*—Vivian Chang
*Assistant Examiner*—Lester G. Kincaid
(74) *Attorney, Agent, or Firm*—Pearne & Gordon LLP

(57) ABSTRACT

A portable cellular phone including the ability to customize a ring signal. The device accepts a spoken voice signal entered via a microphone and converts that signal into a digital audio signal. The device then obtains musical scale information from the digital audio signal by extracting frequency components. The device uses those frequency components to generate an audio output signal based on the extracted musical scale frequency components. This output signal can then be used as the ring signal, or for other purposes. Thus, a user can input a desired musical scale using the user's voice to customize the ring signal without relying solely on keypad operations.

9 Claims, 7 Drawing Sheets

PORTABLE CELLULAR PHONE WITH CUSTOM MELODY RING SETTING CAPABILITY

BACKGROUND OF THE INVENTION

The present invention relates to a portable cellular phone which enables desirable setting of a melody or musical scale of a ringing tone (a tone that announces an incoming call) or a signaling tone(a tone that precedes a recorded announcement), and more particularly, to simple setting of the melody or musical scale.

A conventional portable cellular phone enables the user to compose an original ringing tone by entering a melody by means of a dial button. One type of such a portable cellular phone is described in the Unexamined Japanese Patent Application Publication No. Hei 9-149098.

As shown in FIG. 7, the portable cellular phone comprises an input device 702, by way of which the user performs entry operations; a CPU 701 which converts an input signal to a musical scale; RAM 704 which holds the thus-converted note; ROM 703 in which is stored a program for defining operations of the CPU 701; an interface 706 for outputting the data held in the RAM 704 to an external device; and a ringing tone generator 705 which emits a ringing tone.

In the operation of this portable cellular phone, when the user presses a key provided on the input device 702, the CPU 701 converts a signal entered by way of the key into a corresponding scale code. The thus-converted scale code is written into the RAM 704. The interface 706 reads the scale code from the RAM 704 and imparts the thus-read scale code to the ringing tone generator 705, where a melody is produced according to the scale code when the cellular phone receives an incoming call.

Thus, even the conventional portable cellular phone enables the user to set his favorite melody as a ringing tone.

In the conventional cellular phone, the melody must be entered, in the form of notes of a musical scale, through key operations. Hence, if the user does not have any knowledge about the musical scale, he experiences difficulty in entering a desired melody correctly. As a result, the user must repeatedly perform key-entry operations several times until a desired melody is composed.

SUMMARY OF THE INVENTION

The present invention has been conceived to solve such a problem in the prior art, and the object of the present invention is to provide a portable cellular phone which enables the user to enter a desired melody without involving key operations.

To this end, a portable cellular phone according to the present invention comprises
  conversion means for converting a voice signal entered from a microphone into a digital audio signal;
  computation means which obtains musical scale information (i.e., information in the form of notes of a musical scale) by extracting from the digital audio signal frequency components corresponding to notes of a musical scale and which generates and outputs a musical scale signal from the musical scale information; and
  drive means for driving an audio output device on the basis of the musical scale signal.

With the foregoing means, the user can set an original ringing tone by humming a melody and can input the desired melody in terms of notes of a musical scale without knowledge about the musical scale.

According to a first aspect of the present invention, there is provided a portable cellular phone which enables desirable setting a melody of a ringing tone, the phone comprising:
  conversion means for converting a voice signal entered from a microphone into a digital audio signal;
  computation means which obtains musical scale information by extracting from the digital audio signal frequency components corresponding to notes of a musical scale and which generates and outputs a musical scale signal from the musical scale information; and
  drive means for driving an audio output device on the basis of the musical scale signal, thereby enabling setting of a ringing tone on the basis of the voice entered by the user. As a result, the user can enter a desired melody in terms of a musical scale without involving key operations.

According to a second aspect of the present invention, the portable cellular phone further comprises storage means for storing the musical scale information calculated by the computation means, thereby enabling generation of a musical scale signal from the musical scale information read by the storage means. As a result, the melody previously stored in the storage means can be reproduced, as needed.

According to a third aspect of the present invention, the storage means stores a plurality of musical scale information items, and the computation means generates a musical scale signal by reading one from the musical scale information items. As a result, the arrival of an incoming call may be indicated by a favorite melody selected from a plurality of melodies stored in the storage means in advance.

According to a fourth aspect of the present invention, the portable cellular phone further comprises timing signal generation means which generates a periodical timing signal and outputs the signal to the computation and drive means. Input of the user's voice and extraction of notes of a musical scale are carried out at a predetermined tempo, thus facilitating generation of musical scale information.

According to a fifth aspect of the present invention, the drive means activates the audio output device through use of the timing signal, thereby outputting a rhythm tone. In synchronism with the timing signal, the computation means extracts from the digital sound signal a frequency component corresponding to a note of a musical scale. The user can hum a melody in the rhythm heard from the audio output device, thus facilitating audio input. The computation means extracts frequency components in synchronism with the timing signal, thus efficiently acquiring musical scale information.

According to a sixth aspect of the present invention, the computation means generates from the musical scale information read from the storage means a musical scale signal that is in synchronism with the timing signal and outputs the thus-generated signal. The rhythm of the melody to be reproduced can be changed by means of a timing signal.

According to a seventh aspect of the present invention, the periodicity of the timing signal generated by the timing signal generation means is controlled so as to match the periodicity of amplitudes of the music signal entered from the microphone. Even if the user hums a melody out of synchronization with the timing signal, the timing signal is output in rhythm with the tempo of the melody hummed by the user.

According to an eighth aspect of the present invention, the portable cellular phone further comprises display means for visually indicating the musical scale information stored in the storage means. The user can check the musical scale information not only in the form of musical notes but also in the form of characters or figures.

According to a ninth aspect of the present invention, the portable cellular phone further comprises transfer means for transferring the musical scale information stored in the storage means from the portable cellular phone to an external device. The musical scale information is arranged by means of the external device. The musical scale information can be arranged by means of the external device and restored in the storage means.

DETAILED DESCRIPTION OF THE PREFERRED EMBODIMENTS

Preferred embodiments of the present invention will now be described by reference to the accompanying drawings.
(First Embodiment)

Figure 1:
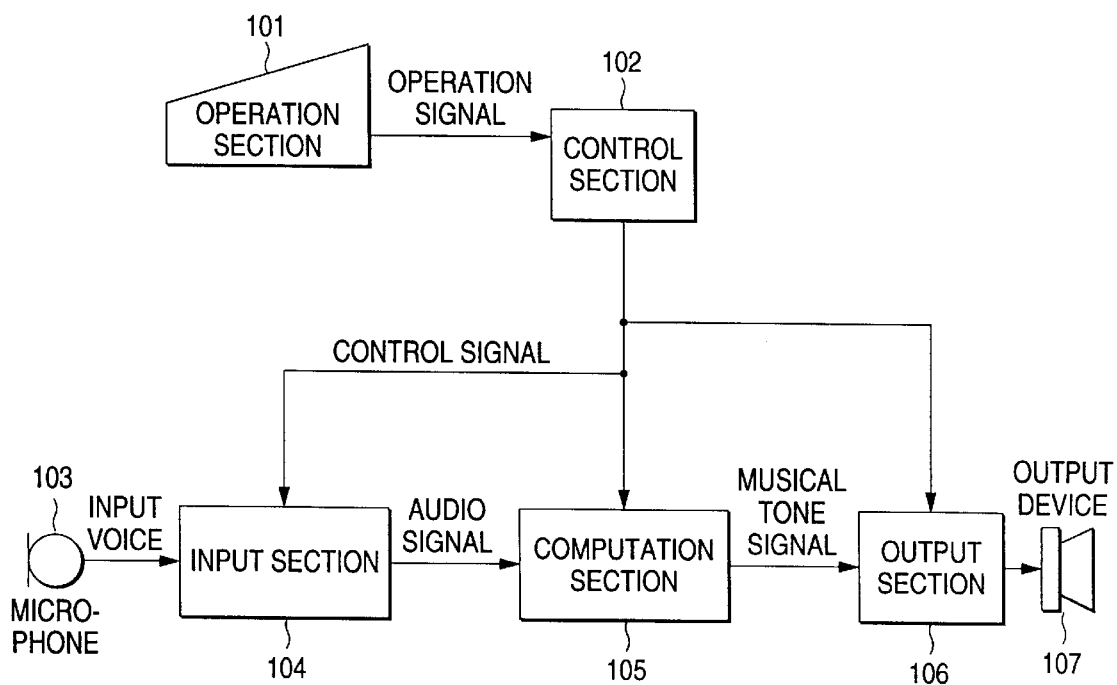
FIG. 1 is a block diagram showing the principal elements of a portable cellular phone according to a first embodiment of the present invention.

As shown in FIG. 1, a portable cellular phone according to a first embodiment comprises an operation section 101 by way of which a function is selected; a control section 102 which controls an individual section on the basis of the selected function; a microphone 103 by way of which a voice is input; an output device 107 which outputs an audible frequency; an input section 104 which converts the voice input by way of the microphone 103 into a digital signal and outputs the signal as an audio signal; computation section 105 which produces musical scale information from the audio signal through computation and outputs a musical scale signal; and an output section 106 which drives the output device 107 on the basis of the musical scale signal output from the computation section 105.

When the user selects a melody input function by actuation of the operation section 101 of the portable cellular phone, the operation section 101 outputs an operation signal to the control section 102. Upon receipt of the operation signal, the control section 102 outputs a control signal to the input section 104, the computation section 105, and the output section 106.

In this state, the user hums a melody into the microphone 103. The microphone 103 outputs the user's voice as an input voice. When the control section 102 outputs a control signal including an input instruction, the input section 104 converts the input voice entered from the microphone 103 into a digital signal and outputs an audio signal.

When the control section 102 outputs a control signal including a computation instruction, through use of mathematical means the computation section 105 extracts from the audio signal entered from the input section 104 frequency components corresponding to a note of musical scale. On the basis of the thus-extracted musical scale information, a musical scale signal is produced and output.

When the control section 102 outputs a control signal including an output instruction, the output section 106 drives the output device 107 on the basis of the musical scale signal output from the computation section 105.

Thus, according to the first embodiment, the user can set a desired musical tone by humming only a melody to be entered in the microphone 103 without involving entry of notes of a musical scale through key operations.
(Second Embodiment)

A portable cellular phone according to a second embodiment stores a musical tone signal produced therein and reproduces the same, as required.

Figure 2:
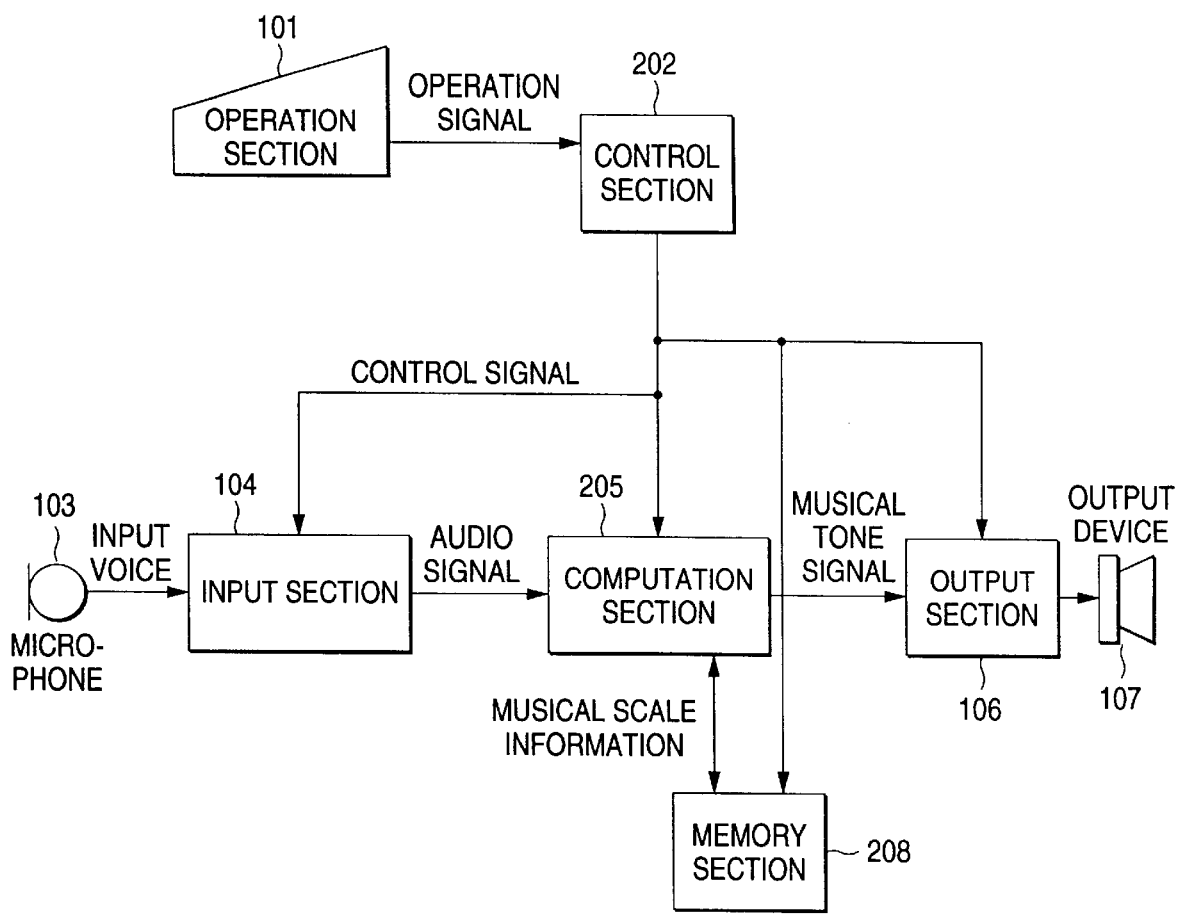
FIG. 2 is a block diagram showing the principal elements of a portable cellular phone according to a second embodiment of the present invention.

As shown in FIG. 2, the portable cellular phone comprises a memory section for storing musical scale information. As a result of addition of a memory section 208, a control section 202 and a computation section 205 differ in operation from those in the first embodiment (FIG. 1). In other respects, the portable cellular phone is identical in configuration and operation with that according to the first embodiment.

When the operation signal is input from the operation section 101, the control section 202 outputs a control signal to each of the input section 104, the computation section 205, the memory section 208, and the output section 106.

When the control section 202 outputs the control signal including a computation instruction, through use of mathematical means the computation section 205 extracts from the audio signal entered from the input section 104 frequency components corresponding to a musical scale. The thus-extracted musical scale information is output to the memory section 208, and a musical scale signal is produced from the musical tone information and output to the output section 106.

In response to the control signal including a recording instruction from the control section 202, the memory section 208 records the musical scale information computed in the computation section 205.

When the control section 202 outputs a control signal including a reproduction instruction, the computation section 205 generates a musical tone signal on the basis of the musical scale information stored in the memory section 208 and outputs the musical scale signal to the output section 106.

Thus, according to the second embodiment, since the musical scale information is recorded in the memory section 208, the musical scale information that is stored in advance by the user can be reproduced when necessary. Further, if a plurality of musical scale information items are recorded, the user can select and reproduce a musical scale information item suited to the preference of the user.
(Third Embodiment)

A portable cellular phone according to a third embodiment enables the user to enter his voice while tapping a rhythm.

Figure 3:
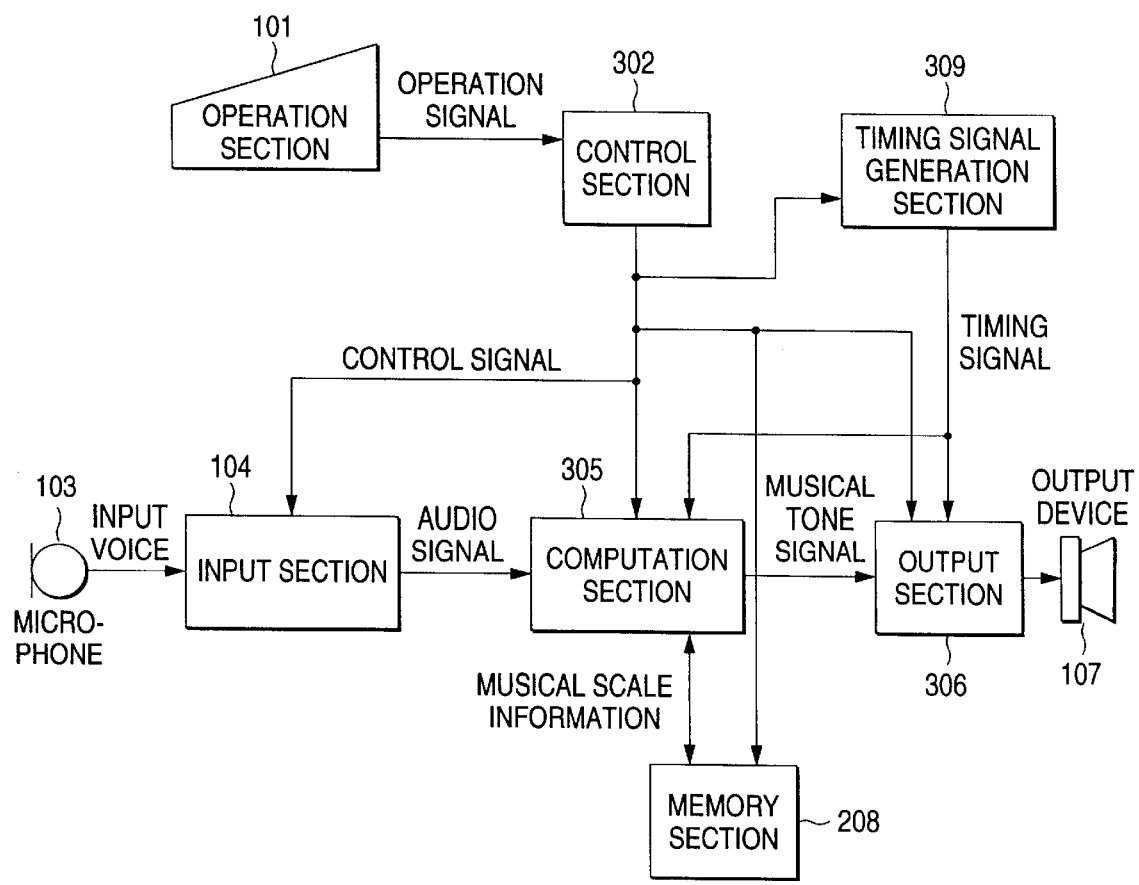
FIG. 3 is a block diagram showing the principal elements of a portable cellular phone according to a third embodiment of the present invention.

As shown in FIG. 3, the portable cellular phone has a timing signal generation section 309 which produces a timing signal. As a result of addition of the timing signal generation section 309, a control section 302, a computation section 305, and an output section 306 differ in operation from those in the second embodiment (FIG. 2). In other respects, the portable cellular phone is identical in configuration and operation with that according to the second embodiment.

When the operation signal is input from the operation section 101, the control section 302 outputs a control signal to each of the input section 104, the computation section 305, the memory section 308, the output section 306, and the timing signal generation section 309.

When the control section 302 outputs the control signal including a timing signal vocalization instruction, the timing signal generation section 309 outputs a periodic timing signal. The timing signal is output to the computation section 305 and the output section 306. When the control section 302 outputs a control signal including a timing output instruction, the output section 306 drives the output device 107 on the basis of the timing signal output to the timing signal generation section 309. Accordingly, the user facing the microphone 103 hears the timing signal as a tone and hence can hum a melody in synchronism with the tempo of the timing signal.

When the control section 320 outputs a control signal including a computation instruction, in synchronism with the timing signal the computation section 305 extracts from the audio signal entered from the input section 104 frequency components corresponding to a musical scale. The thus-extracted musical scale information is output to the memory section 308, and a musical scale signal is produced from the musical tone information and output to the output section 306.

When the control section 302 outputs a control signal including a reproduction instruction, the computation section 305 generates a musical tone signal from the musical scale information stored in the memory section 308 in synchronism with the timing signal and outputs the musical scale signal to the output section 306.

When the control section 302 outputs a control signal including a melody output instruction, the output section 306 drives the output device 107 in synchronism with the timing of the timing signal through use of a musical scale signal output from the computation section 305.

Thus, according to the third embodiment, since the timing signal is output from the output device 107 at the time of entry of a melody, the user can enter a melody while hearing a timing signal. Thus, entry of a more accurate musical scale becomes feasible. Further, the computation section 305 generates musical scale information in synchronism with the timing signal, whereby musical scale information can be produced in a smaller amount of memory than when the musical scale information is produced through use of only an audio signal. Further, at the time of reproduction of a musical scale signal, the tempo of the melody to be output can be modified by changing solely the periodicity of the timing signal. Therefore, the melody can be reproduced in the favorite tempo of the user.

(Fourth Embodiment)

A portable cellular phone according to a fourth embodiment sets the tempo of a timing signal in synchronism with the rhythm of the melody hummed by the user.

Figure 4:
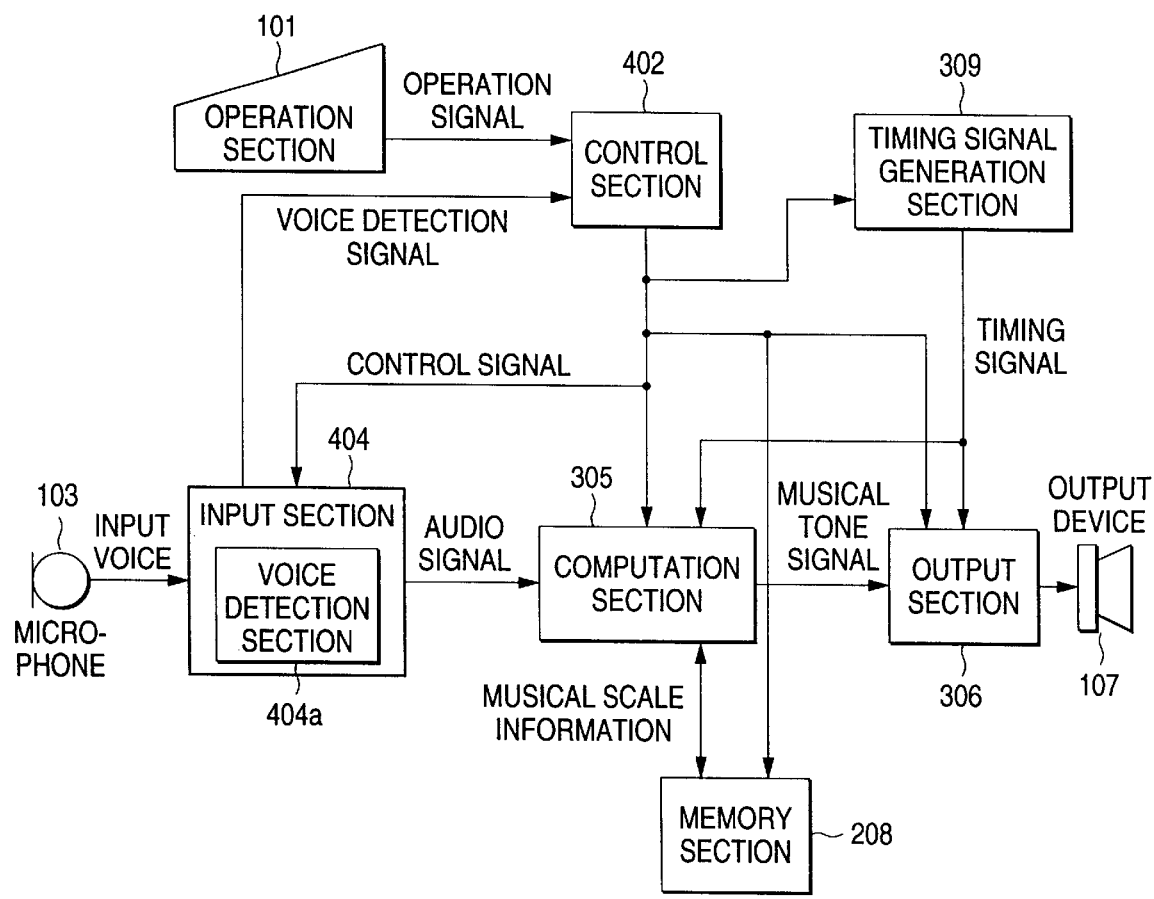
FIG. 4 is a block diagram showing the principal elements of a portable cellular phone according to a fourth embodiment of the present invention.

As shown in FIG. 4, the portable cellular phone has a voice detection section 404a which detects the amplitude of the input voice. A voice detection signal produced on the basis of such detection is output to a control section 402 from an input section 404. In other respects, the portable cellular phone is identical in configuration with that according to the third embodiment (FIG. 3).

When the control section 402 outputs a control signal including an input instruction, the input section 404 of the portable cellular phone converts the voice entered from the microphone 103 into a digital signal and outputs the signal to the computation section 305 as an audio signal. Further, the input section 404 detects, from a change in the amplitude of the input voice detected by the voice detection section 404a, the timing at which the voice is input and the periodicity of the input voice, through use of a mathematical technique. The thus-detected timing and periodicity are inserted into the voice detection signal in the form of timing information and outputs the voice detection signal to the control section 402.

When the operation signal is input from the operation section 101, the control section 402 outputs a control signal to the input section 404, the computation section 305, the memory section 208, and the output section 306. Further, on the basis of the timing information included in the voice detection signal to be input, the control section 402 outputs to the timing signal generation section 309 a control signal for controlling the periodicity of the timing signal.

As a result, when the user inputs a melody in the microphone 103, the timing signal generation section 309 generates a timing signal having a periodicity suited to the rhythm of the user's voice and outputs the timing signal to the computation section 305 and the output section 306.

Accordingly, the user facing the microphone 103 does not need to keep pace with the tempo of the timing signal and can enter a melody at his own tempo.

Thus, according to the fourth embodiment, the voice detection section 404a extracts the timing information from the voice entered by the user, and the control section 402 changes the periodicity of the timing signal output from the timing signal generation section 309 according to the timing information. Since the timing signal makes itself suited to the tempo of the user without the user entering the melody in synchronism with the timing signal, the user can readily input a melody.

(Fifth Embodiment)

A portable cellular phone according to a fifth embodiment enables the user to check a recorded melody by means of indication of characters and figures.

Figure 5:
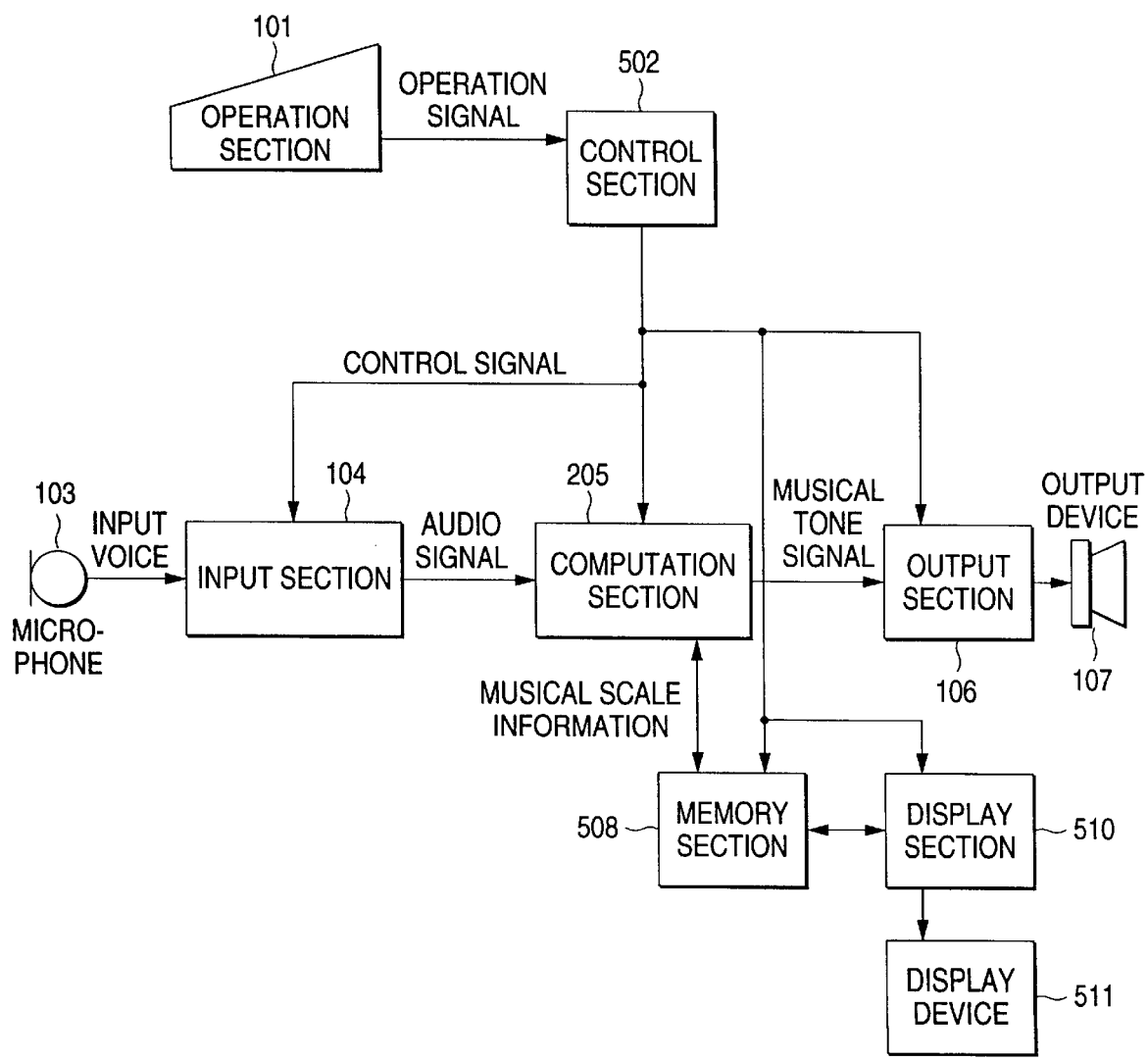
FIG. 5 is a block diagram showing the principal elements of a portable cellular phone according to a fifth embodiment of the present invention.

As shown in FIG. 5, the portable cellular phone comprises a display device 511 for indicating characters and figures; and a display section 510 for performing operations required to cause a display device 511 to indicate the melody recorded in the memory section 508. As a result of addition of the display section 510 and the display device 511, a control section 502 and a memory section 508 differ in operation from those in the second embodiment (FIG. 2). In other respects, the portable cellular phone is identical in configuration and operation with that according to the second embodiment.

When the operation signal is input from the operation section 101, the control section 502 of the portable cellular phone outputs a control signal to the input section 104, the computation section 205, the memory section 508, the output section 106, and the display section 510.

When the operation signal for the purpose of entering a melody is input from the operation section 101, the control section 502 outputs a control signal including a recording instruction to the memory section 508. In accordance with the control signal, the memory section 508 records the musical scale information computed by the computation section 205.

When the user enters an operation signal for the purpose of correcting the recorded melody, the control section 502 outputs to the memory section 508 a control signal including an editing instruction for re-editing the recorded musical scale information. When the control signal including the edition instruction is output, the memory section 508 updates the whole or part of the musical scale information recorded therein to edition data included in the edition instruction output from the control section 502.

At this time, the control signal including a display instruction is output to the display section 510 from the control section 502, and through use of characters and figures the display section 510 indicates on the display device 511 the musical scale information recorded in the memory section 508. Accordingly, by means of the characters and figures indicated on the display device 511, the user can ascertain whether or not the musical scale has been corrected as intended.

Even when the melody is not needed, the musical scale information recorded in the memory section 508 can be indicated on the display device 511 through use of the characters and figures.

As mentioned above, according to the fifth embodiment, the musical scale information recorded in the memory section 508 is displayed on the display device 511 through use of characters and figures. Therefore, the user can ascertain the input musical scale information not only audibly but also visually. Thus, the musical scale information becomes very easily understandable for the user. Further, even when the musical scale information recorded in the memory section 508 is updated through operations by way of the operation section 101, the user can easily check the updated information. Therefore, the user can readily change the recorded musical information to desired musical information.

(Sixth Embodiment)

A portable cellular phone according to a sixth embodiment enables transfer of a recorded melody to an external device and recording of the melody edited by the external device.

Figure 6:
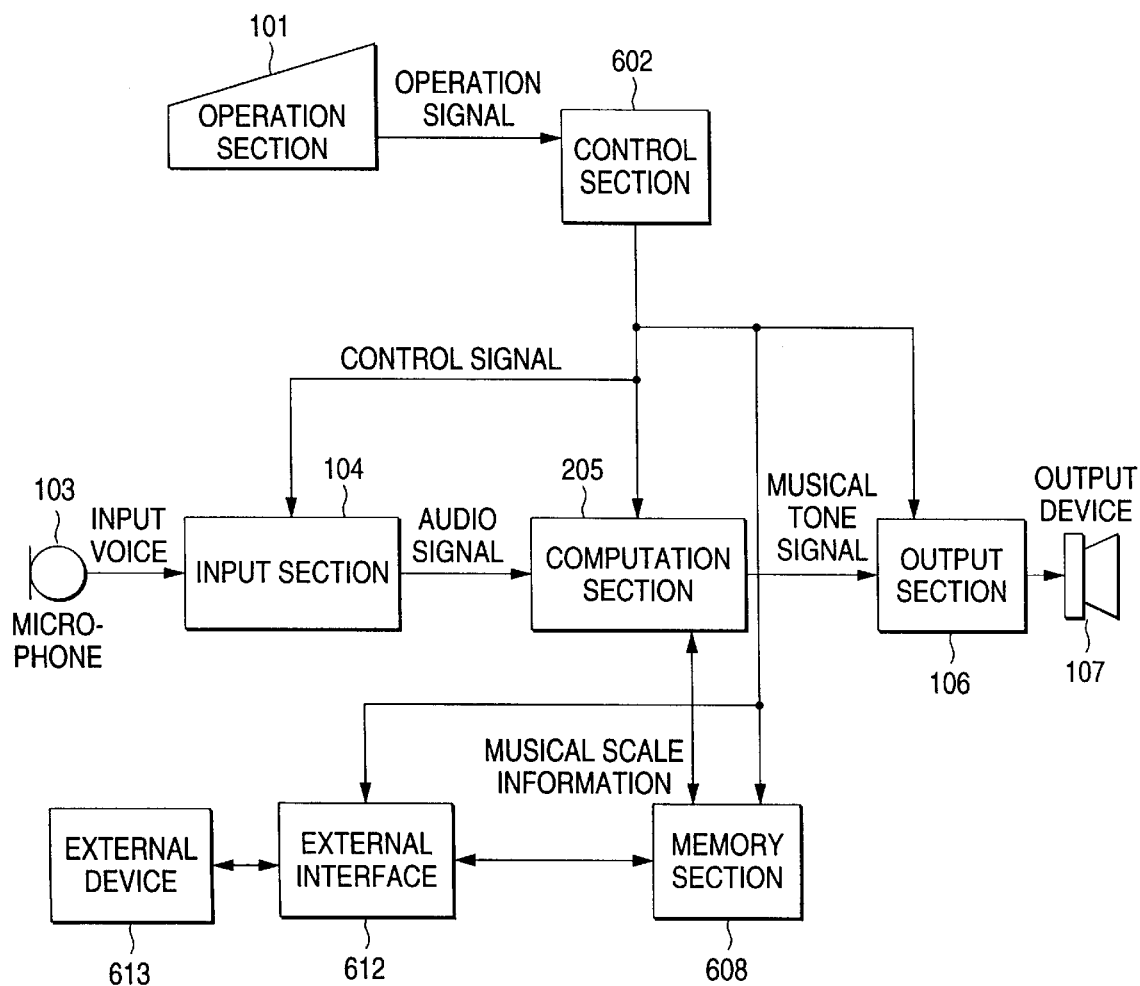
FIG. 6 is a block diagram showing the principal elements of a portable cellular phone according to a sixth embodiment of the present invention.
Figure 7:
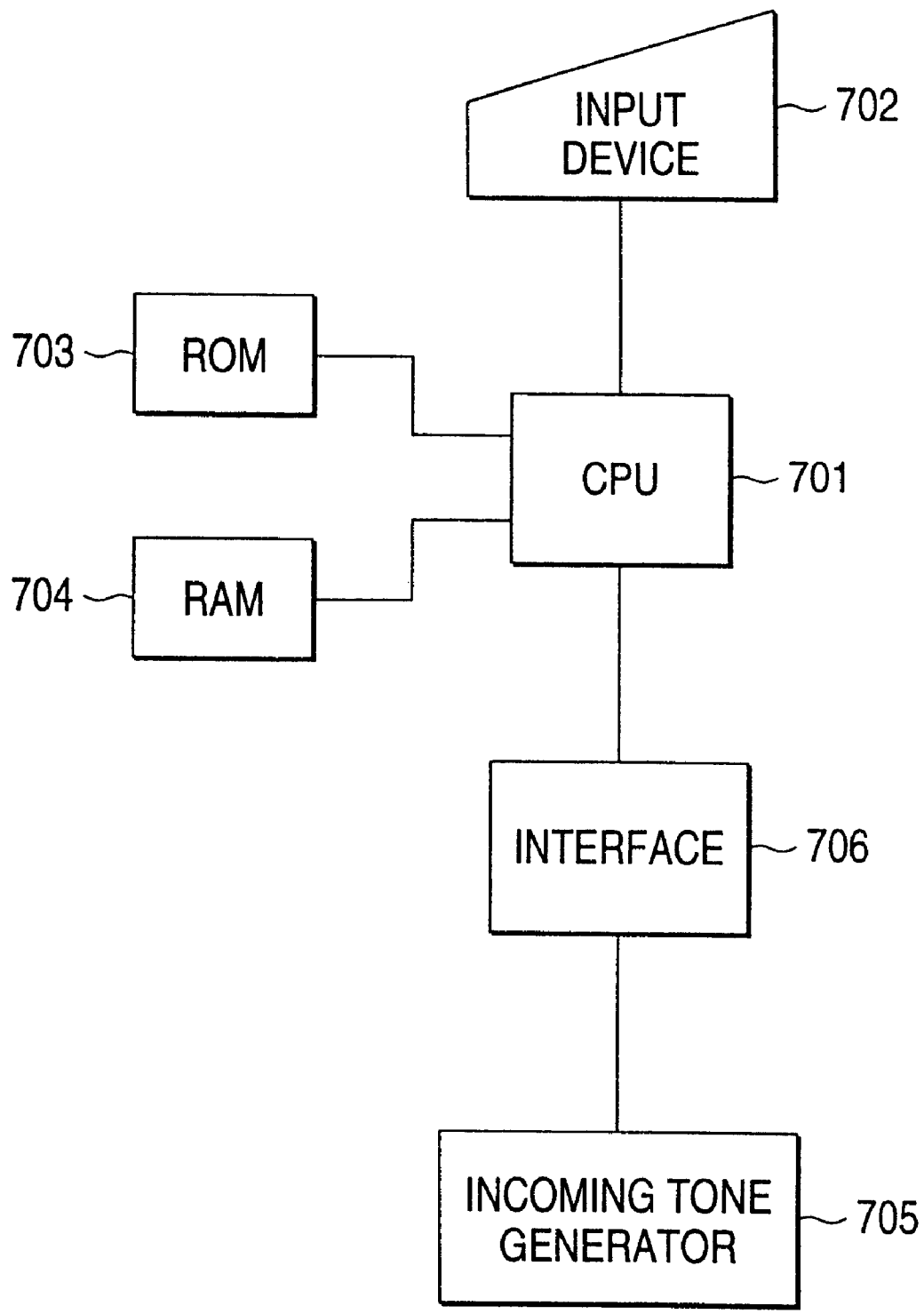
FIG. 7 is a block diagram showing the principal elements of a conventional portable cellular phone.

As shown in FIG. 6, the portable cellular phone comprises an external device 613 and an external interface 612 for outputting or inputting musical scale information to or from the external device 613. As a result of addition of the interface 612 and the external device 613, a control section 602 and a memory section 608 differ in operation from those in the second embodiment (FIG. 2). In other respects, the portable cellular phone is identical in configuration and operation with that according to the second embodiment.

When the operation signal is input from the operation section 101 of the portable cellular phone, the control section 602 outputs a control signal to the input section 104, the computation section 205, the memory section 608, the output section 108, and the external interface 612.

When the control section 602 outputs a control signal including a read instruction, the external interface 612 reads musical scale information from the external device 613 and outputs the thus-read information to the memory section 608. The control section 602 outputs to the memory section 608 a control signal including a write instruction. Upon receipt of the control signal, the memory section 608 records the musical scale information output from the external interface 612. Thus, the musical scale information edited by the external device 613 is recorded in the memory section 608.

When the control section 602 outputs a control signal including a write instruction, the external interface 612 outputs to the external device 613 the musical scale information recorded in the memory section 608.

In this way, according to the sixth embodiment, since the musical scale information can be transferred between the external device 613 and the memory section 608, the musical scale data input by the user of the portable cellular phone can be edited by means of the external device after having been recorded in the external device, so long as the external device has the function of editing a musical scale signal. Further, if the musical scale data stored in the external device are transferred to the portable cellular phone, a melody suited to the preference of the user can be reproduced by his portable cellular phone.

Further, in a case where the external device has a radio-communication function based on a radio wave or an infrared ray, the musical scale data recorded in the memory section 608 can be transferred to a device distant from the portable cellular phone.

As is evident from the foregoing description, the portable cellular phone according to the present invention can automatically generate musical scale information by entry of solely a voice and can set a ringing tone.

Further, in a case where the portable cellular phone has a memory section, the musical information that is produced can be reproduced, as needed. If a plurality of musical scale information items are recorded in advance, the musical scale information suited to the preference of the user can be selected and reproduced.

In a case where the portable cellular phone outputs a timing signal, the user can enter a melody in a more accurate manner, and musical scale information can be extracted in a smaller amount of memory by generation of the musical scale information which is in synchronous with the timing signal. Further, the cycle of the timing signal is changed at the time of reproduction of the musical scale signal, thereby enabling reproduction of the melody at a tempo suited to the preference of the user.

The cycle of the timing signal is changed in synchronism with the timing information included in the voice entered by the user, thus enabling the user to enter his voice at his own tempo.

In a case where the portable cellular phone has display means for indicating musical scale information, the user can readily check the musical scale information through use of characters and figures. Further, the musical scale information can be readily changed to musical scale information suited to the preference of the user.

In a case where the portable cellular phone has an external interface, musical scale information can be transferred between the portable cellular phone and an external device, thus enabling editing of the musical scale information through use of the external device and recording of the thus-edited musical scale information into the portable cellular phone.

What is claimed is:

1. A portable cellular phone which enables setting of a melody for a ringing tone comprising:

conversion means for converting a voice signal entered from a microphone into a digital audio signal;

computation means for obtaining musical scale information from the digital audio signal by extracting frequency components therefrom, said computation means also for generating and outputting a musical scale signal from the musical scale information; and drive means for driving an audio output device on the basis of the musical scale signal, so as to enable setting of a ringing on the basis of the voice entered by the user.

2. The portable cellular phone as defined in claim 1, further comprising:

storage means for storing the musical scale information calculated by the computation means, so as to enable generation of a musical scale signal from the musical scale information read by said storage means.

3. The portable cellular phone as defined in claim 2, wherein, said storage means stores a plurality of musical scale information items, and said computation means generates a musical scale signal by reading one from the musical scale information items.

4. The portable cellular phone as defined in claim 2, further comprising:

display means for visually indicating the musical scale information stored in said storage means.

5. The portable cellular phone as defined in claim 2, further comprising:

transfer means for transferring the musical scale information stored in said storage means from the portable cellular phone to an external device.

6. The portable cellular phone as defined in claim 1, wherein said portable cellular phone further comprises:

timing signal generation means which generates a periodical timing signal and outputs the signal to said computation means and said drive means.

7. The portable cellular phone as defined in claim 6, wherein said drive means activates said audio output device through use of the timing signal so as to output a rhythm tone, and wherein, in synchronism with the timing signal, said computation means extracts from the digital sound signal a frequency component corresponding to the musical scale.

8. The portable cellular phone as defined in claim 6, wherein said computation means generates a musical scale signal in synchronism with the timing signal from the musical scale information read from said storage means, and outputs the generated signal.

9. The portable cellular phone as defined in claim 6, wherein the periodicity of the timing signal generated by said timing signal generation means is controlled so as to match the periodicity of amplitudes of the voice signal entered from the microphone.

\* \* \* \* \*